Sept. 28, 1965  R. C. FISCHER  3,208,535
AUTOMATIC STEERING OF IMPLEMENTS
Filed April 9, 1964  3 Sheets-Sheet 2
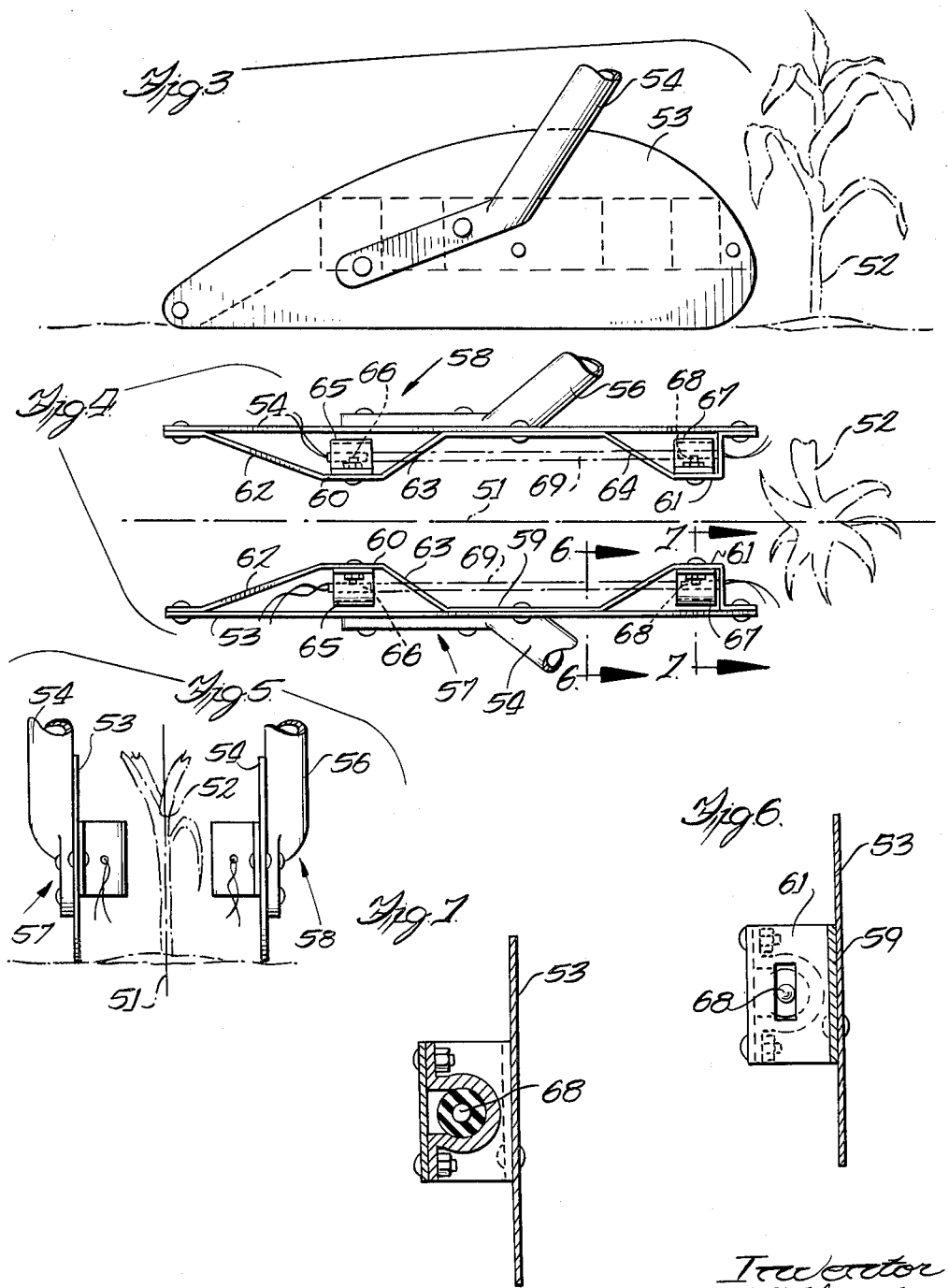

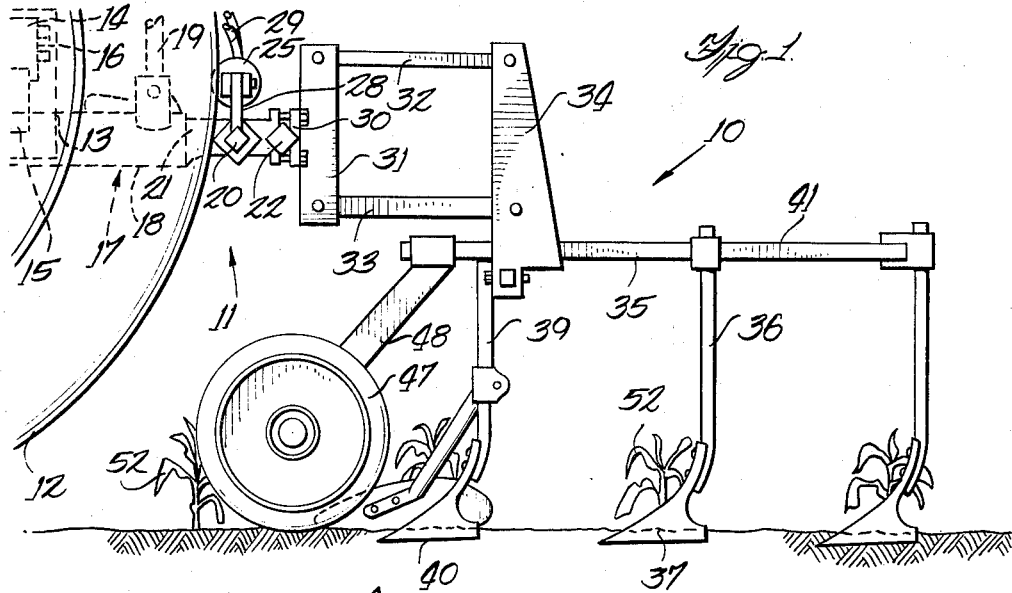

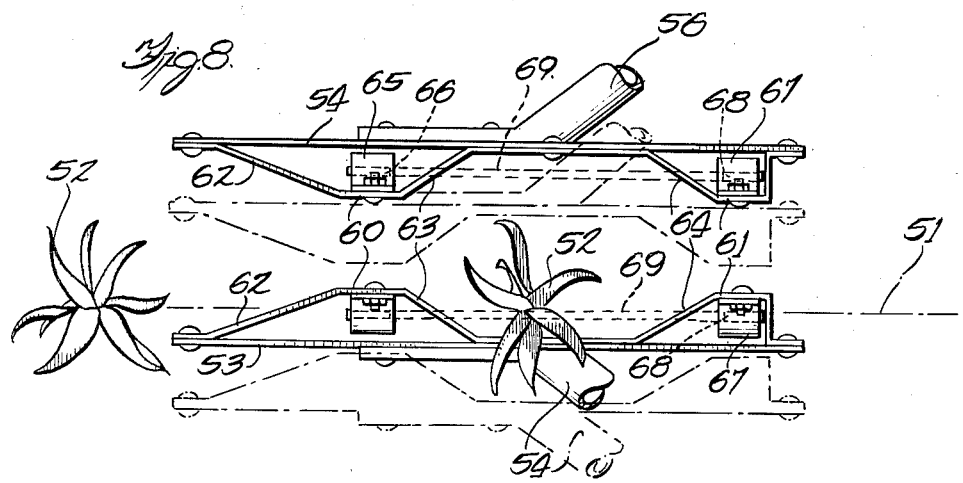
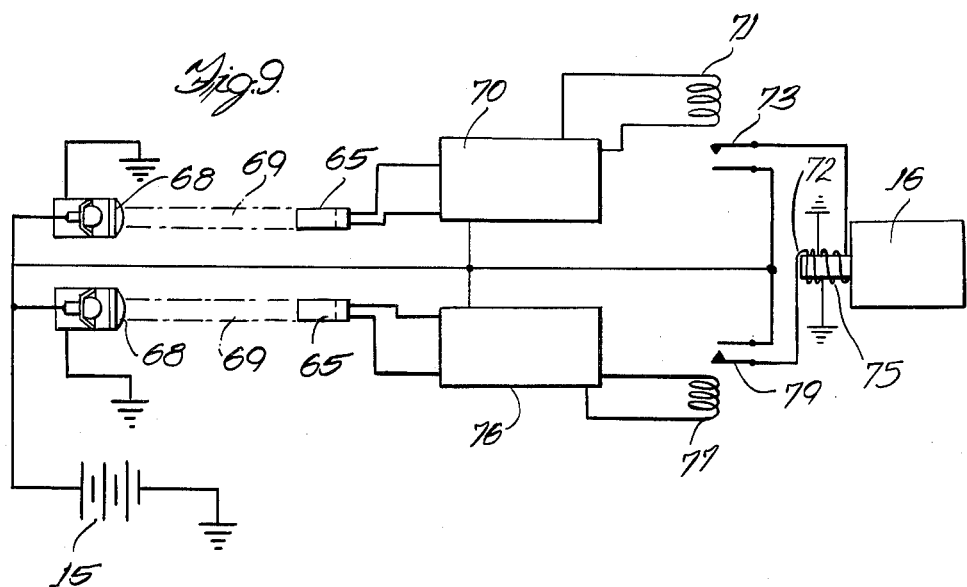

United States Patent Office 3,208,535
Patented Sept. 28, 1965

3,208,535
AUTOMATIC STEERING OF IMPLEMENTS
Raymond C. Fischer, Hinsdale, Ill., assignor to International Harvester Company, Chicago, Ill., a corporation of New Jersey
Filed Apr. 9, 1964, Ser. No. 358,540
3 Claims. (Cl. 172—6)

This invention relates to agricultural machinery and particularly to guidance mechanism therefor. More specifically the invention concerns automatic steering means for crop-treating apparatus.

In a tractive implement such as a harvester, cultivator or the like having power means for propelling it over the ground, the steering of the vehicle upon which the crop-treating apparatus is mounted requires constant vigilance as well as the expenditure of considerable energy on the part of the operator to maintain the cultivators or the like in proper relation to the plant row to avoid straying from the row and damaging plants. The present invention, therefore, has for its object the provision of novel means for automatically steering an implement to relieve the operator of at least a portion of the steering burden.

Another object of the invention is the provision of novel automatic steering means for an agricultural machine, particularly for use in row crops, wherein corrective steering to return the machine to the row from which it has strayed is activated by the growing plant.

Another object of the invention is the provision of improved electrically-operated means utilizing photoelectric cells wherein a growing plant interrupts a light source provided at either side of the plant row, actuating a solenoid or the like having a suitable connection to power-operated means such as the control for a hydraulic or other steering means to return the crop-treating device to its proper relationship to the growing crop.

A further object of the invention is the provision of novel means for steering cultivators and the like in a crop row wherein the earth working tools are held within closer limits relative to the growing crop to avoid damage thereto.

Other objects and advantages of the invention will become clear from the following detailed description when read in conjunction with the accompanying drawings wherein:

FIGURE 1 is a view in side elevation of a portion of an agricultural machine for row-crop treatment incorporating the features of this invention;

FIGURE 2 is a plan view, partly in section, of a portion of the structure shown in FIGURE 1;

FIGURE 3 is an enlarged detail in side elevation showing the sensing apparatus of this invention;

FIGURE 4 is a plan view of the structure shown in FIGURE 3;

FIGURE 5 is a rear elevation of the structure shown in FIGURE 4;

FIGURE 6 is a section taken on the line 6—6 of FIGURE 4;

FIGURE 7 is a section taken on the line 7—7 of FIGURE 4;

FIGURE 8 is a plan view similar to FIGURE 4 showing the position of the sensing apparatus when it is actuated by a growing plant;

FIGURE 9 is an electrical circuit diagram for the sensing apparatus of this invention.

FIGURES 1 to 8 of the drawings show the elements of a cultivator generally designated by the numeral 10 mounted on a travelling vehicular support such as a tractor 11 having rear wheels 12, only one of which is shown, and a body 13.

The tractor is provided with a suitable power plant, not shown, a source of fluid under pressure 14 and a source of electric current 15, the fluid pressure source 14 including suitable valve control means indicated at 16.

The tractor is provided with a hitch structure 17 comprising laterally spaced socket members 18, only one of which is shown, each of which is connected by a lift link 19 to suitable power lift mechanism on the tractor for raising and lowering the hitch structure.

The implement 10 includes a transversely extending tool bar 20 having laterally spaced forwardly projecting shaft members 21, only one of which is shown, for reception in socket members 18 for raising and lowering the tool bar 20 with the hitch structure 17. The implement also includes another transversely extending carrier in the form of a steerable tool bar 22 having one or more clamps 23 secured thereto and carrying a sleeve member 24 slidably mounted on the tool bar 20. Power steering apparatus in the form of hydraulic cylinder 25 is pivotally connected to a lug 26 secured to member 24 and has a piston rod 27 slidable therein and pivotally connected to a lug 28 affixed to the tool bar 20. Fluid under pressure is supplied to cylinder 25 through hose lines 29 from the power source 14 on the tractor to extend and retract piston rod 27. Upon extension and retraction of piston rod 27, sleeve member 24 slides on bar 20 and carries with it the tool bar 22.

Clamps 30 are secured to tool bar 22, and to each clamp is affixed a pair of vertical plates 31 to which are pivotally connected rearwardly extending vertically spaced parallel links 32 and 33, the rear ends of which are pivoted to a standard 34.

To the lower end of the outer standard 34 is secured a longitudinally extending drag link 35 to the rear end of which is affixed a vertical shank 36 upon the lower end of which is mounted a crop treating device in the form of a cultivator shovel 37. Drag link 35 has a right angle portion 38 to which is secured another standard 39 upon the lower end of which is mounted another cultivator shovel 40.

As shown in FIGURE 2, the inner standard 34 has secured to its lower end a drag link 41 to which is secured one or more tool shanks 42, upon the lower end of which is mounted a shovel 43. An inwardly directed angled portion 44 of drag link 41 has mounted thereon a shank 45 which carries at its lower end a shovel 46. A gauge wheel 47 is mounted by an arm 48 upon a forward extension of drag link 35.

As will be observed from FIGURE 2, the cultivator gangs just described are designated by the numerals 49 and 50 and straddle a crop row 51 having at spaced locations therein growing plants 52. Gangs 49 and 50 travel in the space between adjacent rows and shovels 40 and 46 penetrate the ground nearest the crop rows 51. In order to provide automatic guidance should the cultivator gangs stray from their proper relationship with the row to be cultivated, applicant has provided sensing means responsive to contact with one of the plants 52 for returning the gangs to their proper position. For this purposes a supporting frame in the form of a vertical shield 53 is mounted on the lower end of an arm 54 secured to tool shank 39 and extending inwardly therefrom toward the crop row on the left hand side in the direction of travel as viewed in FIGURE 2. On the other side of the row another vertical plant shield 55 is secured to the inwardly projecting end of an arm 56 secured to tool shank 45. The shields 53 and 55 forms parts of left and right-hand sensing devices 57 and 58, respectively, and since the devices are substantial duplicates, a description of one will suffice for both.

As shown in FIGURES 4 and 8, each shield 53 and 54 has secured to its inner face a metal strip 59 bent to form longitudinally extending projections 60 and 61, the projection 60 having a forwardly sloping face 62 and a rearwardly sloping face 63, and projecting 61 having a forwardly sloping face 64.

Each of the projections 60 has mounted therebetween and the body of the shield 54 a housing 65 carrying a photoelectric cell 66, and each projection 61 has mounted therebetween and the body of the shield 54 a housing 67 carrying a light source in the form of a bulb 68 in longitudinal alignment with and directing a beam 69 at cell 66. Suitable openings, not shown, are provided in the faces 63 and 64 to accommodate passage of beam 69.

FIGURE 9 shows an electric circuit diagram illustrating the manner in which the sensing apparatus is utilized to actuate the hydraulic valve structure 16 of the tractor. Shield 53 preferably rides upon the surface of the ground and is tapered from front to rear as shown in FIGURE 3 to lift leaves of plant 52 out of the way so that, should the cultivator gang stray to one side or the other of the plant row the electrical circuit will be actuated only by the main stem of the plant. With reference to FIGURES 4 and 8, should the left hand sensing device 57 move laterally toward the crop row, the plant will first be engaged by the forward slope 62 of projection 60, deflecting the plant and causing it to slide along the rearward slope 63 to the position indicated in FIGURE 8 with the plant 52 in the path of and interrupting light beam 69. The current generated in the left-hand photo-electric cell 65 passes through an amplifier 70 and actuates a relay 71 to close switcht 73. Current from the power source 15 on the tractor then flows through switch 73 and solenoid 75 to the ground, the solenoid actuation the hydraulic valve 16 of the tractor by any well-known means to cause fluid to flow into hydraulic cylinder 25 in a direction to retract the piston rod 27, shifting tool bar 22 and the gangs 49 and 50 to the left until plant 52 no longer interrupts the light beam.

Correspondingly, if the right hand light beam 69 is interrupted the electric current generated in right hand photo-electric cell 65 will flow to amplifier 76 to actuate relay 77 and close switch 79. This will permit electric current to flow through switch 79 and solenoid 75 to the ground actuating the hydraulic valve 16 to reverse the direction of cylinder 25 to correspondingly laterally shift the gangs 49 and 50.

While the invention has been described in a preferred embodiment, it should be understood that modifications may be made therein without departing from the spirit of the invention or the scope of the appended claims.

What is claimed is:

1. In row crop cultivators and the like including a travelling support having a source of electric current and steerable means for guiding the cultivators in the row, cultivators mounted on said support for lateral shifting relative thereto, means for automatically operating said steerable means to laterally move the cultivators and avoid damage to the plants in the crop row comprising, a sensing device carried by the support and movable with said cultivators having a frame, a light source and a photo-electric cell mounted on said frame at longitudinally spaced locations, said light source being operatively connected to said current source to provide a beam parallel to the crop row directed at and energizing said cell, and said cell being operatively connected to said steerable means to actuate the latter in response to interruption of said beam by a plant to laterally move said cultivators and avoid damage to the plants in the row, said sensing device frame comprising a shield disposed in a vertical plane spaced laterally of the crop row, and a pair of longitudinally spaced projections extending cropwardly from said shield in which projections said light source and cell are mounted to provide a light beam therebetween, said light beam being disposed inwardly of the outer ends of said projections and the forward crop engaging face of the forwardmost of said projections being inclined, whereby upon lateral movement of said sensing device into the crop row the crop plants are deflected laterally by the forwardmost of said projections prior to being received in the path of the light beam between said projections.

2. In a row crop treating implement propelled by a vehicle having thereon sources of electric current and of hydraulic fluid under pressure including valve means controlling the flow of said fluid, an implement carrier mounted on the vehicle and laterally shiftable relative thereto, said carrier having a crop treating device disposed to one side of a crop row, a hydraulic cylinder mounted on the vehicle receiving fluid from said source and operatively connected to said carrier for shifting it laterally, a pair of sensing members mounted on said carrier on opposite sides of the crop row in association with said treating device and in spaced relation to the growing plants in the row, each said sensing member having mounted thereon a photo-electric cell and a light source longitudinally spaced and receiving energy therefrom, an electrical circuit associated with each said sensing member including means transmitting current from said current source to said light source and providing a longitudinally extending beam between said light source and said cell and parallel to the crop row to energize said cell, said beams being interruptable upon movement of said sensing member laterally in either direction into the path of a growing plant, and said circuits including means operatively connecting said cells to said valve means for actuating said cylinder to effect right and left hand lateral shifting of said implement carrier.

3. In a row crop treating implement propelled by a vehicle having thereon sources of electric current and of hydraulic fluid under pressure including valve means controlling the flow of said fluid, an implement carrier mounted on the vehicle and laterally shiftable relative thereto, said carrier having a crop treating device disposed to one side of a crop row, a hydraulic cylinder mounted on the vehicle receiving fluid from said source and operatively connected to said carrier for shifting it laterally, a pair of sensing members mounted on said carrier on opposite sides of the crop row in association with said treating device and in spaced relation to the growing plants in the row, each said sensing member having mounted thereon a photo-electric cell and a light source longitudinally spaced and receiving energy therefrom, an electrical circuit associated with each said sensing member including means transmsitting current from said current source to said light source and providing a longitudinally extending beam between said light source and said cell and parallel to the crop row to energize said cell, said beams being interruptable upon movement of said sensing member laterally in either direction into the path of a growing plant, and said circuits including means operatively connecting said cells to said valve means for actuating said cylinder to effect right and left hand lateral shifting of said implement carrier, said crop treating devices comprising cultivator shovels secured to standards affixed to said carrier, and said sensing devices being secured to said standards between said shovels and the crop row, each of said sensing devices comprising a generally vertical shield having longitudinally spaced projections extending laterally therefrom toward the crop row, said light source being mounted in one of said projections and said cell in the other to provide said beam therebetween, one of said projections being engageable with a growing plant to deflect the latter and direct it between said projections and in the path of said beam.

References Cited by the Examiner

UNITED STATES PATENTS

| | | | |
|---|---|---|---|
| 2,177,803 | 10/39 | Ferte et al. | 172—6 |
| 2,424,288 | 7/47 | Severy | 180—1 |
| 2,484,069 | 10/49 | Boncompain | 172—6 |
| 2,592,689 | 4/52 | Hann | 176—6 |
| 3,026,945 | 3/62 | Tanke | 172—509 |
| 3,038,544 | 6/62 | Richey et al. | 172—5 |

FOREIGN PATENTS

| | | |
|---|---|---|
| 560,196 | 9/57 | Belgium. |
| 461,497 | 11/49 | Canada. |
| 1,097,099 | 2/55 | France. |

ABRAHAM G. STONE, *Primary Examiner.*